Patented Sept. 16, 1941

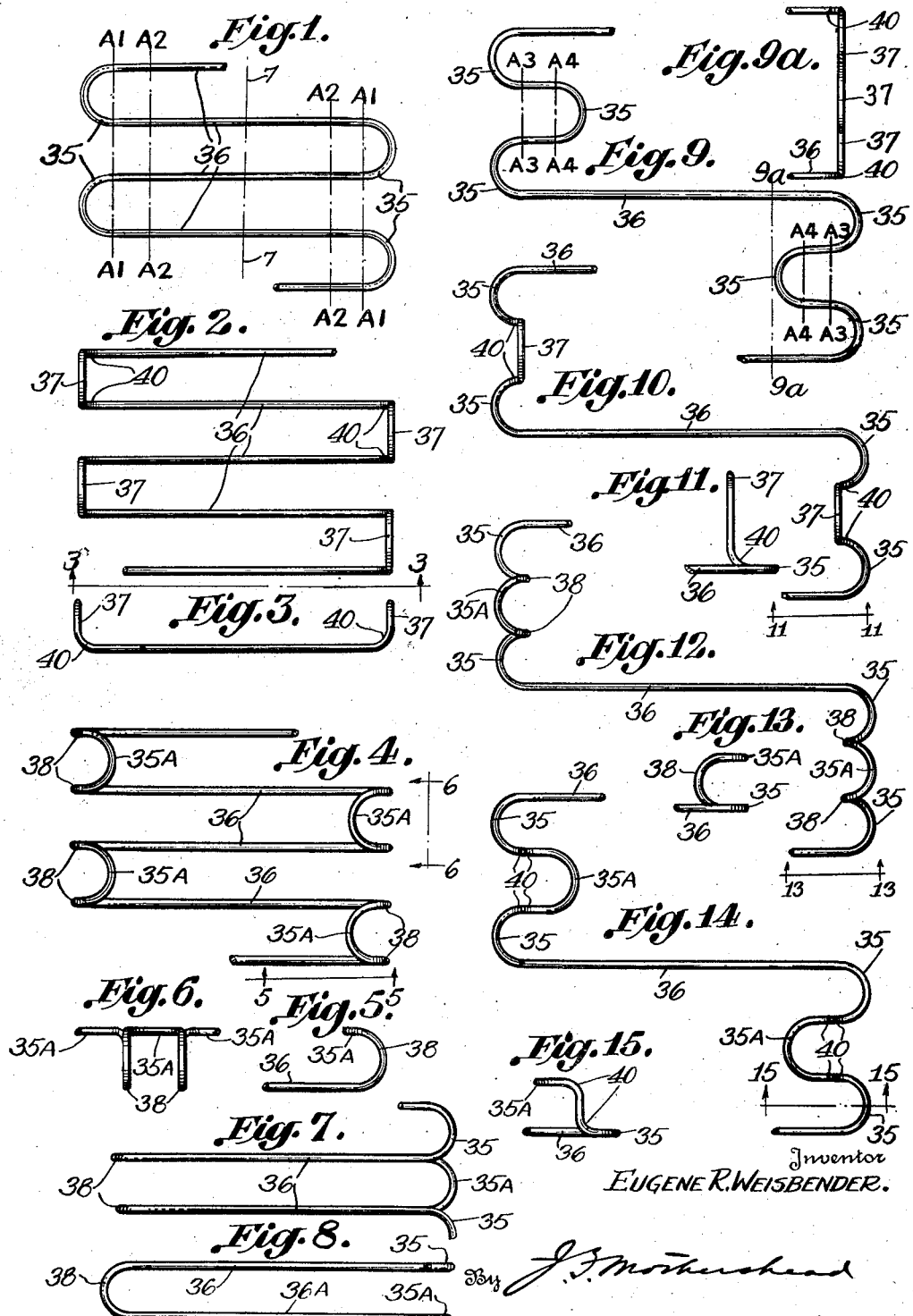

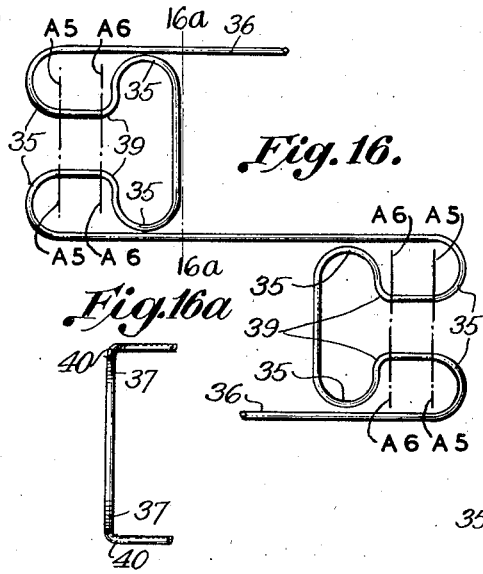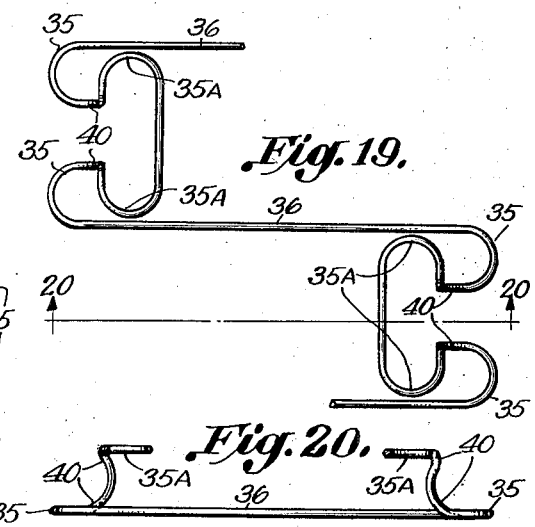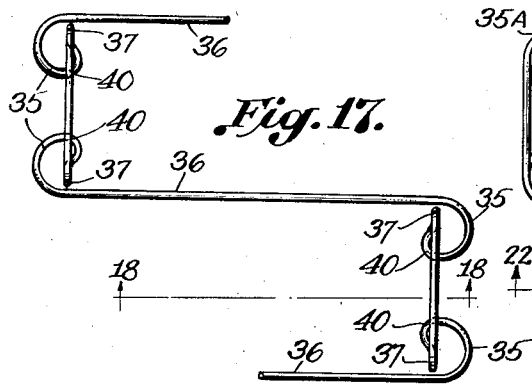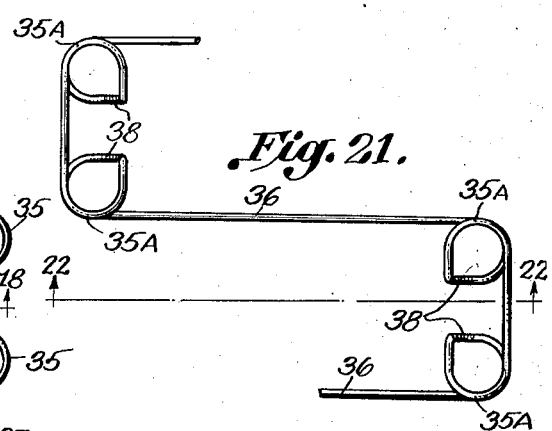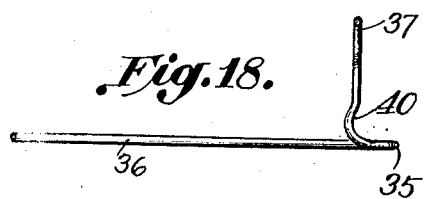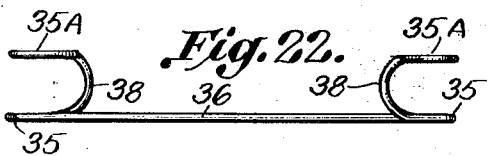

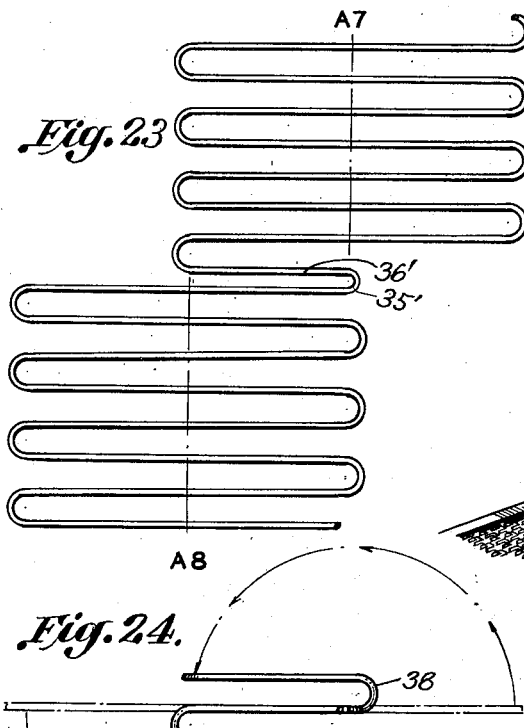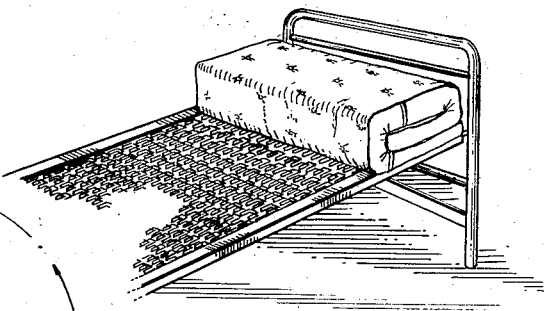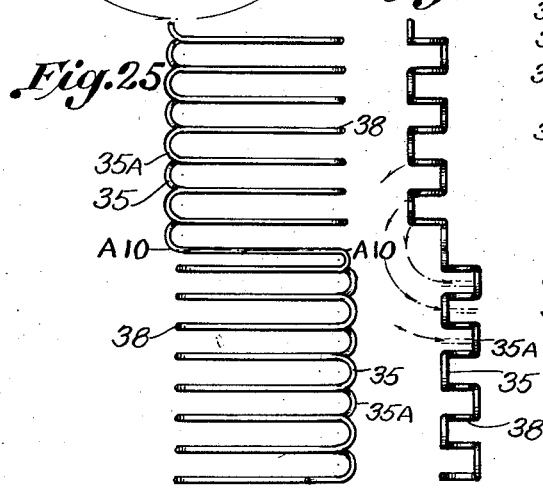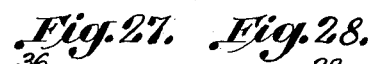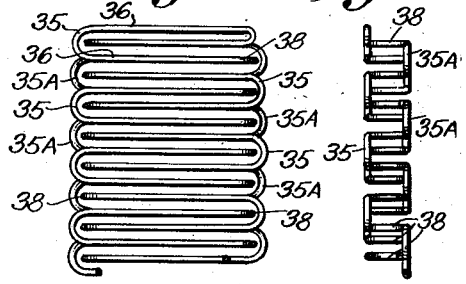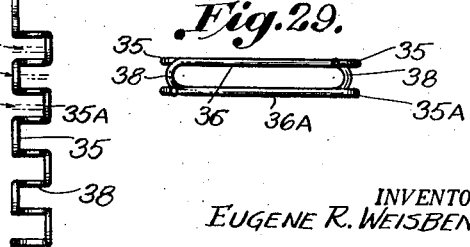

2,256,158

UNITED STATES PATENT OFFICE 2,256,158

SPRING

Eugene R. Weisbender, Manhattan, Kans.

Application July 24, 1940, Serial No. 347,227

13 Claims. (Cl. 245—2)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to improved metallic springs as well as to the method of manufacturing the same, applicable for all purposes wherein durable elastic metallic springs are required or used.

A specific object of my invention is the production of springs, endowed with durability and elasticity and characterized by desirable gentle resiliency for the formation of relatively flat and thin spring fabrics and mattresses for beds and upholstering of seats, cushions, back-rests and other yieldable surfaces, primarily for comfort, the prevention of dead shocks, and durability against sagging and distortion whereby to maintain a substantially level support with a minimum, if any, of loss of yielding capability to weight and return to normalcy.

A further purpose of the improvements is to produce springs not alone of the foregoing characteristics, but given to vertical and longitudinal as well as lateral resiliency of uniform degree throughout the springs.

In my improved springs the disposal and elimination of such as intersections, lathes, slats, tie-links, webbing, woven network, free ends, hinged connections, and above all the elimination of frictional wearing and noise-making contacts between relative and co-acting parts of the springs are primary objects.

A further object of the invention is to supplement the single spring arches of the known and conventional types of flat springs with a plurality of yieldable spring arches in order to relieve separate arcs of undue strain which may tend to permanently distort the spring, and to increase the resiliency of the springs.

A still further object of the invention is to provide a spring having associated yieldable arches vertically disposed to support horizontally disposed arches and thereby tend to prevent permanent distortion of horizontal arcs.

It is also a primary object of my invention to provide springs having horizontally disposed spring-arches on one plane, which, when subjected to tension, are counteracted by horizontally disposed arches on another plane acting in compression, and which, i. e., the arches of both planes, are relieved of excessive bending stresses by vertically disposed arches.

It is also a primary object of my invention to form the improved ribbon like spring sections of a continuous piece of elongated stock and to provide a greater length of the stock and a greater number of spring arches than heretofore provided in spring ribbons of comparable width and thickness to thereby increase the yieldability in spring ribbons since flexibility increases with the increase in the length of the stock within the ribbon.

With the foregoing and other objects in view, my invention resides in the combination of parts and in the details of construction described and claimed hereinafter, certain embodiments thereof having characteristics of my invention, and by which the same may be practiced, being illustrated in the accompanying drawings, in which—

Fig. 1 is a plan view of a spring section illustrating an initial formation in the construction of an embodiment of my invention:

Fig. 2, an inverted view of a spring section constituting an embodiment of my invention and which may be also considered an intermediate formation in the construction of other embodiments;

Fig. 3, an end view of an inverted spring section of the Fig. 2 construction or formation taken at line 3—3 of the illustration thereof;

Fig. 4, an inverted view of a spring section constituting an embodiment of my invention;

Fig. 5, a partial end view of an inverted spring section of the Fig. 4 formation taken at line 5—5 of the illustration thereof;

Fig. 6, an inverted edge view of a spring section of the Fig. 4 construction taken at line 6—6 of the illustration thereof;

Fig. 7, a plan view of a spring section constituting an embodiment of my invention;

Fig. 8, an end view of the section of the embodiment shown in Fig. 7;

Fig. 9, a plan view of one margin of a spring section constituting an embodiment of my invention and which also may be considered as an intermediate formation in the construction of other embodiments;

Fig. 9a, an inverted view of one margin of a spring section constituting an embodiment of my invention;

Fig. 10, an inverted view of a spring section constituting an embodiment of my invention and which also may be considered as an intermediate formation in the construction of other embodiments;

Fig. 11, a partial end view of an inverted spring section of the Fig. 10 construction taken at line 11—11 of the illustration thereof;

Fig. 12, an inverted view of a spring section illustrating an embodiment of my invention;

Fig. 13, a partial end view of an inverted spring section of the Fig. 12 construction taken at line 13—13 of the illustration thereof;

Fig. 14, an inverted view of a spring section illustrating an embodiment of my invention;

Fig. 15, a partial end view of an inverted spring section of the Fig. 14 construction taken at line 15—15 of the illustration thereof;

Fig. 16, a plan view of one margin of a spring section illustrating an embodiment of my invention and which may also be considered as an intermediate formation in the construction of other embodiments;

Fig. 16a, a plan view of one margin of a spring section constituting an embodiment of my invention;

Fig. 17, an inverted view of a spring section illustrating an embodiment of my invention and which may also be considered as an intermediate formation in the construction of other embodiments;

Fig. 18, a partial end view of an inverted spring section of the Fig. 17 formation taken at line 18—18 of the illustration thereof;

Fig. 19, an inverted view of a spring section illustrating an embodiment of the invention;

Fig. 20, an end view of an inverted spring section of the Fig. 19 formation taken at line 20—20 of the illustration thereof;

Fig. 21, an inverted view of a spring section illustrating an embodiment of the invention;

Fig. 22, an end view of an inverted spring section of the Fig. 21 construction taken at line 22—22 of the illustration thereof;

Fig. 23, a plan view of the initial formation of an embodiment of my invention, a section of which is shown in Figs. 27, 28 and 29;

Fig. 24, an end view of an intermediate formation in the construction of the embodiment shown in Figs. 27, 28 and 29;

Fig. 25, a plan view of the Fig. 24 formation;

Fig. 26, an edge view of the Fig. 25 formation;

Fig. 27, a plan view of a spring section illustrating an embodiment of my invention;

Fig. 28, an edge view of the Fig. 27 embodiment;

Fig. 29, an end view of the Fig. 27 embodiment; and

Fig. 30, a diagrammatic perspective of one application of springs of the character of my invention.

On reference to the drawings it will be seen that various kinds and conformations of springs are shown as some examples and illustrations of the peculiar principles of my invention to increase flexibility by increasing the length of the stock in a spring ribbon without increasing the width of the ribbon or materially increasing its thickness over other spring ribbons of comparable width and thickness.

Before describing the illustrated examples, it should be noted that the various conformations are uniformly formed of continuous lengths of wire-like, strand-like, rod-like, or strip-like material of resilient characteristics. Steel wire is believed the most suitable, but not necessarily the only satisfactory material, for the various constructions. The material may be tempered if desired to any degree of hardness or spring temper, although satisfactory and durable springs of the character may be made of ordinary drawn steel wire.

For the purposes of clarity, the various completed spring constructions will be referred to as of ribbon-like formation since they may be generally thought of as having a width greater than thickness and a length greater than width. In describing the formations of the spring ribbons the same will be described from an assumed horizontal position in order that the angular dispositions of the spring arches may be described with respect to such a plane. It is to be understood therefore that reference, for example, to a vertically disposed arch has reference to the position of the arch when the ribbon is in a horizontal position, which may become, for example, a horizontally disposed arch when the spring ribbon is in a vertical position.

As shown in Fig. 1, the known type of flat springs of the class to which the present invention pertains comprises a ribbon-like spring element formed of a piece of elongated stock bent sinuously to provide selvages, so to speak, of substantially semi-circular spring arches or curves 35 and substantially straight, uniformly spaced surface or supporting portions 36 which continue from or lie intermediate the curves in substantially parallel relation to one another and transversely of the ribbon-like whole. In this known type of spring ribbon, the spring arches of the convolutions are horizontally disposed on a plane with, and in a direction at right angles to, portions 36. In this formation no means are provided for relieving the arches 35 of compressional and tensional bending stresses as the surface portions 36 are moved to and from one another by longitudinal tension and compression on the spring ribbon or as those portions are moved to and from one another during longitudinal bowing or flexure of the spring ribbon. Longitudinal bowing or flexure of the spring ribbon also subjects the arches 35 to torsional strains and stresses simultaneously with bending strains on the arches during the aforementioned stretching or longitudinal flexure of the spring ribbon. In the transverse flexure of the Fig. 1 spring ribbon the surface portions 36 must stand the entire bending stresses without support or relief from the spring arches 35.

The Fig. 2 embodiment, also shown in Fig. 3, is initially formed as that of Fig. 1 except that the ribbon is made considerably wider by increasing the length of the surface members 36. The horizontally disposed spring arches 35 of the Fig. 1 formation are then converted into vertically disposed inverted semi-circular spring arches 37 extending at right angles to the surface portions 36 by bending along, for example, lines A1—A1 and A1—A1 of Fig. 1, to form vertically disposed quadrant curves 40 longitudinally of the members 36. By this formation the width of the ribbon is reduced to substantially that of Fig. 1 without sacrificing the additional length of the stock over that of Fig. 1. During longitudinal bowing of the spring ribbon of the Fig. 2 formation, the arches 37, in assuming bending stresses, tend to relieve the surface members 36 of the torsional strain to which they are subjected under similar conditions in Fig. 1. The arches 37 are also themselves relieved of the aforementioned torsional stresses to which they would be subject as arches 35 in Fig. 1 during longitudinal bowing of the ribbon.

The formation shown in Fig. 2 may be used as such with considerable advantages over that of Fig. 1 or it may be considered an an intermediate step in the formation of the embodiment of Figs. 4, 5 and 6 which is formed initially as that shown in Fig. 1, but of greater width, than as that shown in Figs. 2 and 3, and thence bent, as along lines A2—A2 and A2—A2 of Fig. 1, to convert the vertically disposed quadrant arches 40 of Fig. 2 into vertically disposed semi-circular arches 38 lying longitudinally of the members 36 and at right angles to the plane of the ribbon. By the latter steps the width of the ribbon is reduced to the comparative width of Fig. 1 and the semi-circular vertically disposed arches 37 of Fig. 2 are converted into horizontally disposed arches 35—A extending at right angles to the surface member 36 and on a plane substantially parallel with but spaced beneath the surface of the spring ribbon. In this arrangement the horizontally disposed arches 35—A are again subjected to twisting strain by the longitudinal flexure of the spring ribbon but to a lesser degree than arches 35 of Fig. 1 since more spring arches as well as a still greater length of stock is provided in a ribbon of substantially the same width.

It is to be understood that in the formation shown inverted in Fig. 4, the crowns of the horizontal arches 35—A may extend in a direction outwardly (not shown) rather than inwardly, as shown, beneath the surface members 36, and in which event the vertical semi-circular arches 38 would each be divided into two reverse quadrant, or possibly semi-circular, arches producing an S-shape vertical formation rather than a single semi-circular formation as shown. This will be more readily understood if it is remembered that throughout the various modifications all bends in the stock of which the springs are made are on a curve, as distinguished from sharp angles, to produce greater yieldability.

The spring ribbon formation of Figs. 7 and 8 is formed initially as in Fig. 1 but more than twice as wide to produce a completed ribbon of comparative width. The ribbon is then bent longitudinally, as along line 7—7 of Fig. 1, to provide vertically disposed arches 38 longitudinally of the members 36 and at right angles to the plane of the ribbon; to provide vertically spaced surface portions 36 and 36—A on two planes; and horizontally disposed arches 35 and 35—A alternately positioned one above the other and lying at right angles to the upper and lower surface members 36 and 36—A. In this formation the torsional strain to which an arch 35 of Fig. 1 may be subjected is distributed between two horizontally disposed arches 35 and 35—A, and two of the vertically disposed arches 38.

The formation of Figs. 7 and 8 may be used as such or considered as an intermediate step in the formation of the spring ribbon illustrated in Figs. 27, 28 and 29, described hereinafter.

In the Fig. 9 formation all portions of the spring ribbon are on one plane as in Fig. 1, but differs therefrom by the inclusion of a greater length of stock, in a ribbon comparable in width with that of Fig. 1, by the provision of three alternately disposed horizontal arches 35 between the ends of each pair of transverse surface members 36. In this formation the torsional stresses to which a single arch 35 of Fig. 1 may be subjected is distributed among three of such arches and the surface members 36 are more readily relieved of bending stresses.

The Fig. 9 formation may be used as such or considered as an initial step in the formation of the embodiments such as shown in Figs. 9A, and 10 through 15.

In the formation of the embodiment of Fig. 9A the initially formed ribbon is of sufficiently greater width than Fig. 9 would ordinarily be in order that the same may be bent as at line 9a—9a to provide quadrant curves 40; convert the horizontally disposed arches 35 into vertically disposed arches 37 at right angles to the ribbon as well as to the surface members 36; and to reduce the width of the ribbon to one comparable with that of the other embodiments.

The embodiment of Figs. 10 and 11 is initially formed as that shown in Fig. 9 and thence bent as along lines A4—A4 and A4—A4 to provide vertically disposed quadrant curves 40 longitudinally of members 36 and at right angles to the plane of the ribbon. By this formation the central horizontally disposed arches 35 of Fig. 9 are converted into inverted vertically disposed arches 37 at right angles to the 36.

The formation of Figs. 10 and 11 may also be used as such or considered as an intermediate step in the formation of the embodiments of Figs. 12 through 15.

In the Figs. 12 and 13 embodiment the quadrant curves 40 of Fig. 10 are converted, as by bending along lines A3—A3 and A3—A3 of Fig. 9, into semi-circular arches 38 at right angles to the ribbon and the vertical arches 37 of Fig. 10 are thereby converted into horizontally disposed arches 35—A on a plane beneath and spaced from the surface members 36 and horizontal arches 35.

The Figs. 14 and 15 formation is similar to that of Fig. 12, except that the arches 35—A of Fig. 12 are reversed and extend inwardly beneath the surface members 36 rather than outwardly as in Fig. 12. In this formation a pair of reverse quadrant curves 40 at right angles to the plane of the ribbon are provided in lieu of each semi-circular arch 38 of Fig. 12 in order to bring about the reverse positioning of arches 35—A, Fig. 14, as compared with arches 35—A of Fig. 12. The Fig. 14 formation, as well as that of Fig. 12, is somewhat similar to that of Fig. 4, but improved by the provision of horizontal arches 35 in addition to arches 35—A.

The Fig. 16 formation somewhat resembles that of Figs. 1 and 9 except for the provision of additional horizontal arches between the ends of each pair of surface members 36 and at right angles thereto. By this formation a considerable additional length of stock over that of Figs. 1 and 9 is utilized in a ribbon of comparable width by the formation of four semi-circular horizontally disposed arches 35 and two horizontally disposed quadrant curves 39 between each pair of surface members 36. The Fig. 16 formation may be used as such or considered an initial step toward the formation of such embodiments as shown in Figs. 16A and 17 through 22.

The spring ribbon illustrated in Fig. 16 may be initially formed of greater width and thence bent as along line 16a—16a, by the formation of quadrant curves 40, to convert the horizontally disposed arches 35 into vertically disposed arches 37 at right angles to the plane of the ribbon and thereby reduce the width of the ribbon to that comparable with Fig. 1 even though a considerable additional length of stock is employed.

The embodiment of Figs. 17 and 18 somewhat resembles that of Figs. 2 and 10, but utilizes additional stock for a ribbon of comparable width by the provision of arches. This embodiment is formed first as that of Fig. 16 and thence bent as along lines A6—A6 and A6—A6 to form vertically disposed quadrant curves 40 longitudinally of the surface members 36 and extending at right angles to the plane of the ribbon. Two of the four semi-circular horizontally disposed arches 35, between each pair of surface members of Fig. 16, are converted into two vertically disposed semi-circular arches 37 at right angles to the plane of the ribbon as well as to the surface members 36. The resultant formation of Fig. 17 may be considered a final formation or it may be considered as an intermediate step toward the formation of the embodiments shown in Figs. 19 through 22.

The formation of Figs. 19 and 20 may be considered somewhat similar to those of Figs. 4 and 14, but improved to provide additional vertical, as well as horizontal, arches and a considerable additonal length of stock yet within a ribbon of comparable width. This formation is first formed as shown in Fig. 16, then bent as along lines A6—A6 and A6—A6 to provide vertically disposed quadrant curves 40, as in Fig. 17, and thence bent in the reverse direction as along lines A5—A5 and A5—A5 to provide additional vertically disposed quadrant curves 40, extending at right angles to the ribbon, and to convert the vertically disposed semi-circular arches 37 of Fig. 17 into horizontally disposed arches 35—A on a plane spaced beneath the arches 35 and the surface members 36.

The embodiment illustrated in Figs. 21 and 22 may be considered as an improvement over the somewhat similar formation of Fig. 12 by the provision of additional semi-circular horizontally disposed arches 35—A and is formed similar to that of Fig. 19 except that the reverse curves 40 of Fig. 19 are converted into semi-circular vertically disposed arches 38 longitudinally with the surface members 36 and at right angles to the plane of the ribbon. The arches 35—A are thereby carried outwardly beneath the arches 35 instead of inwardly, as in Fig. 19, beneath the surface members.

As previously mentioned in connection with Figs. 7 and 8, the spring ribbon embodiment illustrated in Figs. 27, 28 and 29, is initially formed on one plane with sections offset horizontally from a middle point, as illustrated in Fig. 23, by the formation of one surface member 36' of but half the length of the surface members of the offset sections. The respective sections are then bent in opposite directions longitudinally thereof, as along lines A—7 and A—8, to provide, as shown in Fig. 24, vertically disposed semi-circular arches 38 longitudinally with the surface members 36 and 36—A. Thus far formed, the reversely bent sections are no longer horizontally offset, but become vertically offset, as shown in Figs. 24 and 25, and more clearly in Fig. 26.

From an inspection of Fig. 25, it will be seen that the selvage edges of the respective vertically offset sections are reverse in formation, i. e., horizontally disposed arches 35 and 35—A are provided in staggered relation on two planes along one edge of one vertical offset section, while vertically disposed arches 38 are provided along the same edge of the other section and vice versa with respect to the other edges of the respective sections. The arch 35' at the short end of the short intermediate surface member 36' is but about one-half the diameter of the remaining arches so that by twisting the one short surface member 36', intermediate the sections, 180° along its axis, or as along line A10—A10 of the Fig. 25 step in the formation, in the direction shown by the arrows in Fig. 26, the vertical arches 38 on the opposite edges of the respective vertically offset sections will be brought into positions freely circumscribed by the horizontally disposed arches 35 and 35—A of the other opposite edges of the sections. There is thereby provided two planes of surface members 36 and 36—A spaced vertically in parallel relation by means of vertically disposed arches 38 at both edges of the spring ribbon and at right angles thereto. The surface members 36 and 36—A are also spaced horizontally from each other in their respective planes by means of horizontally disposed arches 35 and 35—A. By this arrangement the arches disposed at right angles to each other on each edge of the spring ribbon may be subjected to either or both compressional and tensional stresses without interference or frictional contact and a single pair of vertically disposed surface members 35 and 35—A may be subjected to considerable bending without contacting an adjacent pair.

It is to be understood that the spring ribbons described are not alone intended for bed-springs, upholstering and such uses as have been previously mentioned and may also be employed, for example, as a resilient reinforcement such as may be imbedded as a resilient fabric in rubber or other yieldable or non-yieldable material. It is also to be understood that within the scope of my invention the arches and curves referred to, for the purposes of description, as semicircular or quadrant may be greater or lesser in degree; that the surface members may depart from horizontal or parallel relation; and that the spring ribbon may depart from a straight, horizontal or uniform formation. It is to be further understood that one or more of the arch formations described and shown along the edges of the spring ribbons may be formed intermediate the edges of the ribbon at some intermediate point in the surface members 36 and/or 36—A without departing from the scope of my invention.

Having described my invention and illustrated embodiments by which the same may be practiced, what I claim is:

1. A ribbon-like spring formed of a continuous piece of elongated stock into substantially uniplaned surface-forming members transversely of the ribbon and spaced from one another longitudinal of the ribbon, and a spring arch between each adjacent pair of said members, said arches being disposed on a plane at right angles to the plane of said ribbon.

2. A ribbon-like spring formed of a continuous piece of elongated stock into substantially straight and uni-planed surface-forming members transversely of the ribbon and spaced from one another longitudinal of the ribbon, and a plurality of spring arches between each adjacent pair of said members and on substantially the same plane therewith.

3. A ribbon-like spring formed of a continuous piece of elongated stock into substantially uniplaned surface-forming members transversely of the ribbon and spaced from one another longitudinal of the ribbon, a plurality of spring arches between each adjacent pair of said members disposed on a plane at right angles to the plane of said ribbon, and at least one spring arch between each of the same aforesaid pairs of members disposed on a plane spaced from and substantially parallel with the plane of the members of said ribbon.

4. A ribbon-like spring formed of a continuous piece of elongated stock into substantially uni-planed surface-forming members transversely of the ribbon and spaced from each other longitudinal of the ribbon, a plurality of spring arches between each adjacent pairs of said members disposed on a plane substantially at right angles to the plane of the ribbon, and a plurality of spring arches between each of the same aforesaid pairs of members disposed hroizontally on a plane substantially with that of the aforesaid surface-forming members.

5. A ribbon-like spring formed of a continuous piece of elongated stock into substantially uni-planed surface-forming members transversely of the ribbon and spaced from one another longitudinal of the ribbon, a plurality of spring arches between adjacent pairs of said members disposed on a plane substantially at right angles to the plane of the ribbon, a plurality of spring arches between each of the same aforesaid pairs of members disposed horizontally on a plane substantially with that of the aforesaid surface-forming members, and at least one spring arch between each of the same aforesaid pairs of members disposed horizontally on a plane spaced from and substantially parallel with the aforesaid surface-forming members.

6. A ribbon-like spring formed of a continuous piece of elongated stock into surface-forming members transversely of the ribbon spaced laterally of each other in vertically disposed pairs producing upper and lower substantially parallel and uni-planed spaced surfaces, at least one spring arch disposed at right angles to the plane of the ribbon between each pair of vertically spaced pairs of said members, and at least one spring arch disposed on a plane substantially with and between each pair of horizontally spaced pairs of said members on each of said upper and lower surfaces.

7. A ribbon-like spring formed of a continuous piece of elongated stock into surface-forming members transversely of the ribbon spaced laterally of each other horizontally of the ribbon in vertically spaced pairs producing upper and lower substantially uni-planed spaced surfaces, at least one spring arch disposed at right angles to the plane of the ribbon between each pair of vertically spaced pairs of said members, and at least one spring arch disposed on a plane with said ribbon between at least alternate horizontally spaced surface-forming members of each of said upper and lower surfaces.

8. A ribbon-like spring comprising a continuous piece of elongated stock bent into a plurality of surface-forming members spaced in pairs, the members of each of said pair being spaced from one another by arch formations at alternate ends of adjacent pairs of members, and said pairs of members being spaced in alignment by other arch formations at alternate ends of adjacent pairs of members.

9. A ribbon-like spring comprising a plurality of surface-forming members spaced vertically from one another in vertically disposed pairs by vertically disposed arch formations at alternate ends of adjacent vertically disposed pairs of members and spaced horizontally in horizontally aligned vertically disposed pairs by horizontally disposed arch formations at alternate ends of adjacent vertically disposed pairs of members.

10. A ribbon-like spring comprising a continuous piece of elongated stock bent into a plurality of surface-forming members spaced vertically from one another in vertically disposed pairs by vertically disposed arch formations at alternate ends of adjacent vertically disposed pairs of members and spaced horzontally in horizontally aligned vertically disposed pairs by horizontally disposed arch formations at alternate ends of adjacent vertically disposed pairs of members.

11. A ribbon-like spring formed of an elongated piece of stock by bending the same into a series of substantially uni-planed convolutions continuing into a second series of substantially uni-planed convolutions offset with respect to the first series of convolutions on substantially the same plane therewith, thereafter offsetting the plane of the two series by folding one of said series longitudinally along a middle line therof to bring one portion of that series on a plane substantially parallel with but spaced from the other portion thereof, and similarly folding the other series of convolutions in a direction opposite to that of the first folded series to bring the portions of the second folded series into a relation similar to the portions of the first folded series, and thereafter interleafing the folded convolutionary members of the two series by twisting a portion of the stock intermediately connecting the two series to bring one folded offset series into interleafing relation with the other on substantially the same plane therewith, whereby to form two substantially flat resilient surfaces spaced from one another by yieldable spring arches resulting from the aforesaid bends and folds.

12. A spring fabric comprising a plurality of ribbon-like springs secured at their ends to a supporting frame in laterally adjacent substantially parallel relation, said ribbon-like springs having surface-forming members extending transversely of the ribbon and spaced from each other by a plurality of spring arches each lying in planes at angles to one another.

13. The method of forming ribbon-like springs having greater resiliency than ribbon-like springs of a comparable width and length formed of an elongated piece of stock into surface-forming members extending transversely of the ribbon and spaced from one another by a single spring arch, which method comprises increasing the length of the stock, over that within the aforesaid construction, within a ribbon-like spring, of a width and length comparable with the aforesaid construction, by the formation of a plurality of spring arches, within the elongated piece of stock, between each adjacent pair of said members.

EUGENE R. WEISBENDER.